(12) United States Patent
Ankan et al.

(10) Patent No.: US 8,909,643 B2
(45) Date of Patent: Dec. 9, 2014

(54) INFERRING EMERGING AND EVOLVING TOPICS IN STREAMING TEXT

(75) Inventors: Saha Ankan, Chicago, IL (US);
Arindam Banerjee, Roseville, MN (US); Shiva P. Kasiviswanathan, White Plains, NY (US); Richard D. Lawrence, Ridgefield, CT (US); Prem Melville, New York, NY (US); Vikas Sindhwani, Hawthorne, NY (US); Edison L. Ting, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/315,798

(22) Filed: Dec. 9, 2011

(65) Prior Publication Data
US 2013/0151520 A1    Jun. 13, 2013

(51) Int. Cl.
*G06F 17/30*    (2006.01)

(52) U.S. Cl.
USPC .......................................... 707/737; 707/738

(58) Field of Classification Search
USPC ......................................................... 707/737
See application file for complete search history.

(56) References Cited

U.S. PATENT DOCUMENTS

| | | | |
|---|---|---|---|
| 5,794,178 A | 8/1998 | Caid et al. | |
| 2007/0208764 A1 | 9/2007 | Grisinger | |
| 2008/0133488 A1* | 6/2008 | Bandaru et al. | 707/3 |
| 2009/0094231 A1* | 4/2009 | Marvit et al. | 707/5 |
| 2010/0057798 A1* | 3/2010 | Zhang et al. | 707/722 |
| 2010/0211570 A1* | 8/2010 | Ghanea-Hercock et al. | 707/739 |
| 2011/0131223 A1* | 6/2011 | Patterson | 707/758 |
| 2011/0320715 A1* | 12/2011 | Ickman et al. | 711/118 |

OTHER PUBLICATIONS

Blei, D. M., et al., "Latent Dirichlet Allocation", Journal of Machine Learning Research, Mar. 2003, pp. 993-1022.
Blei, D. M., et al., "Dynamic Topic Models", Proceedings of the 23rd International Conference on Machine Learning, Jun. 2006, pp. 113-120.
Chou, T., et al., "Using Incremental PLSI for Threshold-Resilient Online Event Analysis", IEEE Transactions on Knowledge and Data Engineering, Mar. 2008, vol. 20, No. 3, pp. 289-299.
Culotta, A., "Towards detecting influenza epidemics by analyzing Twitter messages", 1st Workshop on Social Media Analytics (SOMA '10), Jul. 2010, pp. 115-122.

(Continued)

*Primary Examiner* — Sherief Badawi
*Assistant Examiner* — Courtney Harmon
(74) *Attorney, Agent, or Firm* — Scully, Scott, Murphy & Presser, P.C.; Daniel P. Morris, Esq.

(57) ABSTRACT

A method, system and computer program product for inferring topic evolution and emergence in a set of documents. In one embodiment, the method comprises forming a group of matrices using text in the documents, and analyzing these matrices to identify a first group of topics as evolving topics and a second group of topics as emerging topics. The matrices includes a first matrix X identifying a multitude of words in each of the documents, a second matrix W identifying a multitude of topics in each of the documents, and a third matrix H identifying a multitude of words for each of the multitude of topics. These matrices are analyzed to identify the evolving and emerging topics. In an embodiment, the documents form a streaming dataset, and two forms of temporal regularizers are used to help identify the evolving topics and the emerging topics in the streaming dataset.

19 Claims, 9 Drawing Sheets

(56) References Cited

OTHER PUBLICATIONS

Ding, C., et al., "On the equivalence between Non-negative Matrix Factorization and Probabilistic Latent Semantic Indexing", Computational Statistics & Data Analysis, Apr. 2008, vol. 52, Issue 8, pp. 3913-3927.
Girolami, M., et al., "On an Equivalence between PLSI and LDA", SIGIR '03 Proceedings of the 26th annual international ACM SIGIR conference on Research and development in information retrieval, Jul.-Aug. 2003, pp. 433-434.
Gohr, A., et al., "Topic Evolution in a Stream of Documents", SIAM International Conference on Data Mining, Apr.-May 2009, pp. 859-870.
Ho, N., et al., "Descent Methods for Nonnegative Matrix Factorization", Springer Netherlands, Jan. 2008.
Hoffman, M. D., "Online Learning for Latent Dirichlet Allocation", Proceedings of NIPS 2010,2010.
Hofman, T., et al., "Probabilistic Latent Semantic Analysis", Proceedings of the 22nd annual international ACM SIGIR conference on Research and development in information retrieval, Aug. 1999, pp. 50-57.
Jaggi, M., et al., "A Simple Algorithm for Nuclear Norm Regularized Problems", In Proceedings of 27th International Conference on Machine Learning, Sep. 2010, pp. 471-478.
Kasiviswanathan, S., et al., "Emerging Topic Detection using Dictionary Learning", Proceedings of the 20th ACM international conference on Information and knowledge management, Oct. 2011.
Lee, D. D., et al., "Learning the parts of objects by non-negativematrix factorization", Macmillan Magazines Ltd, Oct. 1999, vol. 401, pp. 788-791.
Lin, C., et al., "Projected Gradient Methods for Non-negative Matrix Factorization", Neural Computation, Oct. 2007, vol. 19, Issue 10, pp. 2756-2779.
Mairal, J., et al., "Online Learning for Matrix Factorization and Sparse Coding", Journal of Machine Learning Research 11, Jan. 2010, pp. 19-60.
Melville, P., et al., "Social Media Analytics: Channeling the Power of the Blogosphere for Marketing Insight", Proceedings of the Workshop on Information in Networks, Sep. 2009.
Paradalos, P. M., et al., "An Algorithm for a Singly Constrained Class of Quadratic Programs Subject to Upper and Lower Bounds", Springer Link, Feb. 1990, vol. 46, Nos. 1-3, pp. 321-328.
Prasad, S., et al., "Emerging Topic Detection using Dictionary Learning", CIKM'11, Oct. 2011.
Saha, A., et al., "Learning Evolving and Emerging Topics in Social Media: A Dynamic NMF approach with Temporal Regularization", WSDM'12, Feb. 2012.
Saha, A., et al., "Dynamic NMFs with Temporal Regularization for Online Analysis of Streaming Text", Proc. NIPS Workshop Mach. Learn. Social Comput, 2010.
Sindhwani, V., et al., "Systems and Methods for Inferring Topic Evolution and Emergence in Streaming Documents", IBM Corporation, Nov. 2010.
Xu, W., et al., "Document Clustering Based on Non-negative Matrix Factorization", SIGIR '03: Proceedings of the 26th annual international ACM SIGIR conference on Research and development in information retrieval, Jul. 2003, pp. 267-273.
Alsumait, L., et al., "On-Line LDA: Adaptive Topic Models for Mining Text Streams with Applications to Topic Detection and Tracking", ICDM '08 Proceedings of the 2008 Eighth IEEE International Conference on Data Mining,Dec. 15-19, 2008, pp. 3-12.
Connell, M., et al., "UMass at TDT 2004", Working Notes of the TDT-2004 Evaluation, Dec. 2-3, 2004.
Yang, Y., et al., "A Study on Retrospective and On-Line Event Detection", Proceedings of SIGIR-98, 21st ACM International Conference on Research and Development in Information Retrieval, Aug. 24-28, 1998, pp. 28-36.
U.S. Office Action dated Sep. 19, 2013 received in related U.S. Appl. No. 13/616,403.
Office Action dated Feb. 14, 2014 received in a related U.S. Appl. No. 13/616,403.

\* cited by examiner

| | | | TDT2 CORPUS | | | | |
|---|---|---|---|---|---|---|---|
| PHASE | NO. OF OLD CLUSTERS | NO. OF DOCS FROM CLUSTERS | NO. OF NEW CLUSTERS | NO. OF DOCS FROM NEW CLUSTERS | $F1_{nvl}$ (our) | $F1_{nvl}$ (NN-Km) | $F1_{nvl}$ (DICT-Km) | $F1_{nvl}$ (NN-DICT) |
| 1 | 18 | 1390 | 2 | 63 | 0.868 | 0.694 | 0.781 | 0.859 |
| 2 | 20 | 2256 | 6 | 139 | 0.349 | 0.324 | 0.364 | 0.338 |
| 3 | 26 | 669 | 3 | 45 | 0.784 | 0.650 | 0.730 | 0.721 |
| 4 | 29 | 2526 | 1 | 140 | 0.163 | 0.130 | 0.146 | 0.155 |
| AVG. | | | | | 0.541 | 0.450 | 0.505 | 0.518 |

| | | | 20 NewsGroup Corpus | | | | |
|---|---|---|---|---|---|---|---|
| 1 | 6 | 572 | 2 | 783 | 0.652 | 0.555 | 0.630 | 0.626 |
| 2 | 8 | 769 | 2 | 991 | 0.586 | 0.536 | 0.561 | 0.519 |
| 3 | 10 | 964 | 2 | 1182 | 0.655 | 0.579 | 0.673 | 0.654 |
| 4 | 12 | 1160 | 2 | 1366 | 0.667 | 0.566 | 0.620 | 0.588 |
| 5 | 14 | 1359 | 2 | 1565 | 0.696 | 0.576 | 0.679 | 0.583 |
| 6 | 16 | 1552 | 2 | 1412 | 0.731 | 0.565 | 0.599 | 0.681 |
| 7 | 18 | 1713 | 2 | 1714 | 0.705 | 0.561 | 0.598 | 0.613 |
| AVG. | | | | | 0.670 | 0.563 | 0.623 | 0.610 |

FIG. 8

INFERRING EMERGING AND EVOLVING TOPICS IN STREAMING TEXT

BACKGROUND OF THE INVENTION

The present invention generally relates to document analysis, and more specifically, to inferring topic evolution and emergence in streaming documents.

Learning a dictionary of basis elements with the objective of building compact data representations is a problem of fundamental importance in statistics, machine learning and signal processing. In many settings, data points appear as a stream of high dimensional feature vectors. Streaming datasets present new twists to the problem. On one hand, basis elements need to be dynamically adapted to the statistics of incoming datapoints, while on the other hand, many applications require early detection of rising new trends. The analysis of social media streams formed by tweets and blog posts is a prime example of such a setting, where topics of social discussions need to be continuously tracked and new emerging themes need to be rapidly detected.

Consider the problem of building compact, dynamic representations of streaming datasets such as those that arise in social media. By constructing such representations, "signal" can be separated from "noise" and essential data characteristics can be continuously summarized in terms of a small number of human interpretable components. In the context of social media applications, this maps to the discovery of unknown "topics" from a streaming document collection. Each new batch of documents arriving at a timepoint is completely unorganized and may contribute either to ongoing unknown topics of discussion (potentially causing underlying topics to drift over time) and/or initiate new themes that may or may not become significant going forward, and/or simply inject irrelevant "noise".

While the dominant body of previous work in dictionary learning and topic modeling has focused on solving batch learning problems, a real deployment scenario in social media applications truly requires forms of online learning. The user of such a system is less interested in a one-time analysis of topics in a document archive, and more in being able to follow ongoing evolving discussions and being vigilant of any emerging themes that might require immediate action. Several papers have proposed dynamic topic and online dictionary learning models (see [D. Blei and J. Lafferty, Dynamic topic models, in ICML, 2006; Tzu-Chuan Chou and Meng Chang Chen, Using Incremental PLSI for Threshold-Resilient Online Event Analysis, IEEE transactions on Knowledge and Data Engineering, 2008; A. Gohr, H. Hinneburg, R. Schult, and M. Spiliopoulou, Topic evolution in a stream of documents, in SDM, 2009; and J. Mairal, F. Bach, J. Ponce and G. Sapiro, Online learning for matrix factorization and sparse coding, JMLR, 2010] and references therein) that either exploit temporal order of documents in offline batch mode or are limited to handling a fixed bandwidth of topics with no explicit algorithmic constructs to attempt to detect emerging themes early.

BRIEF SUMMARY

Embodiments of the invention provide a method, system and computer program product for inferring topic evolution and emergence in a multitude of documents. In one embodiment, the method comprises forming a group of matrices using data in the documents, and analyzing this group of matrices to identify evolving topics and emerging topics. This group of matrices includes a first matrix X identifying a multitude of words in each of the documents, a second matrix W identifying a multitude of topics in each of the documents, and a third matrix H identifying a multitude of words for each of said multitude of topics. These matrices are analyzed to identify a first group of said multitude of topics as the evolving topics and a second group of said multitude of topics as the emerging topics.

In an embodiment, the input is a sequence of streaming documents, and each of the document is associated with a timepoint $t_i$. The group of matrices may include a first sequence of matrices X(t), a second sequence of matrices W(t), and a third sequence of matrices H(t). Each of the first matrices X(t) identifies a multitude of words in each of a set of the documents associated with the timepoints within a defined sliding window $\omega$ in a time period T. Each of the matrices W(t) identifies a multitude of topics in said set of documents associated with the timepoints within the defined window, and each of the matrices H(t) identifies a multitude of words for each of the topics identified in the matrices W(t).

In one embodiment, groups of matrices are analyzed using a defined equation, including the matrices X(t), W(t) and H(t), to identify the evolving and the emerging topics. In an embodiment, the defined equation includes first and second regularizers. The first regularizer $\mu$ enforces a smooth evolution of the evolving topics via constraints on an amount of drift allowed by the evolving topics. The second regularizer $\Omega$ applies a topic bandwidth for early detection of the emerging topics to extract smooth trends of candidate emerging topics.

In one embodiment, said defined equation is an objective function:

$$(W^*, H(t)) = \operatorname*{argmin}_{W,H} \|X(t-w, t) - WH\|_{fro}^2 + \mu \Omega(W)$$

such that $W, H \geq 0$ where X(t−w, t) refers to the document-term matrix in the time interval (t−w) to t.

In another embodiment, groups of matrices are analyzed using a defined equation, including the matrices X(t), W(t) and H(t), to identify the emerging topics. In this embodiment, a two stage approach based on $l_1$-dictionary learning is used to detect emerging topics.

In one embodiment, said defined equation is an objective function:

$$(W^*, H(t)) = \operatorname*{argmin}_{W,H} \|X(t-w, t) - WH\|_{fro}^2 + \mu \Omega(W) \text{ such that } W, H \geq 0$$

In an embodiment, said defined equation is an objective function:

$$W^*, H^* = \operatorname*{argmin}_{W,H} \|X - WH\|W\|_1 + \lambda \|W\|_1 \text{ such that } W, H \geq 0$$

Embodiments of the invention provide an online learning framework to consistently reassemble the data streams into coherent threads of evolving components while also serving as an early warning or detection system for new, rapidly emerging trends.

In an embodiment, the invention provides a framework for online dictionary learning to handle streaming non-negative data matrices with possibly growing number of components. Embodiments of the invention are rooted in non-negative matrix factorizations (NMF) [D. Lee and H. S. Seung, Learning the parts of objects using non-negative matrix factorizations, Nature, 1999] whose unregularized variants for generalized KL-divergence minimization is equivalent to pLSI [C. Ding, T. Li, and W. Peng, On the equivalence between non-negative matrix factorizations and probabilistic latent semantic analysis, Computational Statistics and Data Analysis, 2008]. For squared loss, NMF finds a low-rank approximation to a data matrix X by minimizing $\|X-WH\|_{fro}^2$ under non-negativity and scaling constraints on the factors W and H. It is common to add some form of $l_1$ or $l_2$ regularization, e.g., to encourage sparse factors. If X is an N×D document-term matrix, then W is a N×K matrix of topic encodings of documents, while H is a K×D matrix of topic-word associations, whose rows are the dictionary elements learnt by the NMF approach.

In one embodiment of the invention, given streaming matrices, a sequence of NMFs is learned with two forms of temporal regularization. The first regularizer enforces smooth evolution of topics via constraints on amount of drift allowed. The second regularizer applies to an additional "topic bandwidth" introduced into the system for early detection of emerging trends. Implicitly, this regularizer extracts smooth trends of candidate emerging topics and then encourages the discovery of those that are rapidly growing over a short time window. This setup is formulated as an objective function which reduces to rank-one subproblems involving projections onto the probability simplex and SVM-like optimization with additional non-negativity constraints. Embodiments of the invention provide efficient algorithms for finding stationary points of this objective function. Since they mainly involve matrix-vector operations and linear-time subroutines, these algorithms scale gracefully to large datasets.

In one embodiment of the invention, given streaming matrices, a sequence of NMFs is learned under a robust objective function. The objective function is a combination of the $l_1$-norms of a sparse error (robust reconstruction) and a sparse code, which appears well suited for sparse high-dimensional datasets such as those that arise in text applications. Additionally, there are non-negativity constraints on the sparse code and dictionary, to maintain interpretability.

BRIEF DESCRIPTION OF THE SEVERAL VIEWS OF THE DRAWINGS

FIG. 8 shows the effectiveness of robust $l_1/l_1$ objective function for emerging topic detection.

DETAILED DESCRIPTION

Figure 1:
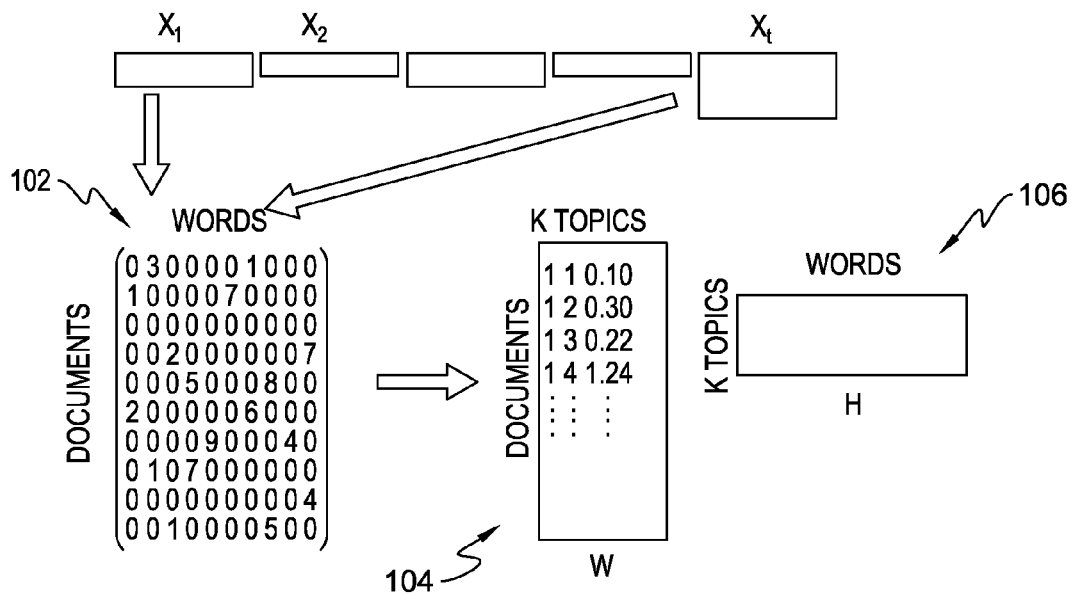
FIG. 1 illustrates static non-negative matrix factorizations.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention provide a method, system and computer program product for inferring topic evolution and emergence in a multitude of documents. In an embodiment, the invention provides a framework for online dictionary learning to handle streaming non-negative data matrices with possibly growing number of components. With reference to FIG. 1, embodiments of the invention are rooted in non-negative matrix factorizations (NMF) [D. Lee and H. S. Seung, Learning the parts of objects using non-negative matrix factorizations, Nature, 1999] whose unregularized variants for generalized KL-divergence minimization is equivalent to pLSI [C. Ding, T. Li, and W. Peng, On the equivalence between non-negative matrix factorizations and probabilistic latent semantic analysis, Computational Statistics and Data Analysis; 2008]. For squared loss, NMF finds a low-rank approximation to a data matrix X 102 by minimizing $\|X-WH\|_{fro}^2$ under non-negativity and scaling constraints on the factors W 104 and H 106. It is common to add some form of $l_1$ or $l_2$-regularization e.g., to encourage sparse factors. If X is an N×D document-term matrix, then W is an N×K matrix of topic encodings of documents while H is a K×D matrix of topic-word associations, whose rows are the dictionary elements learnt by the NMF approach.

In one embodiment, we use the $l_1$ loss function $\|X-WH\|_1$ is used with the motivation that $l_1$ loss function performs better when the underlying noise distribution is spiky.

Figure 2:
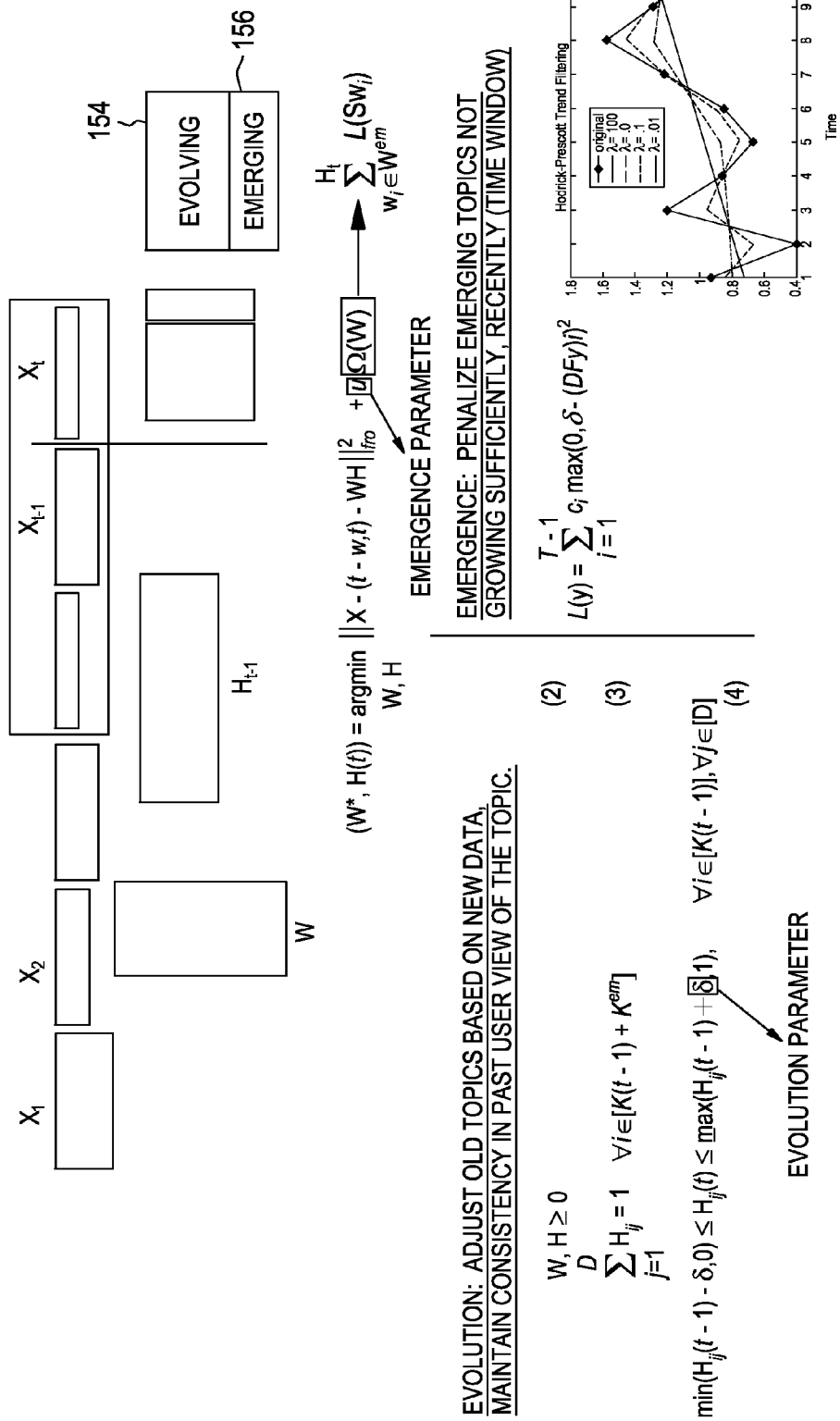
FIG. 2 illustrates dynamic NMFs with temporal regularization.

FIG. 2 illustrates dynamic NMFs with temporal regularization.

Figure 6:
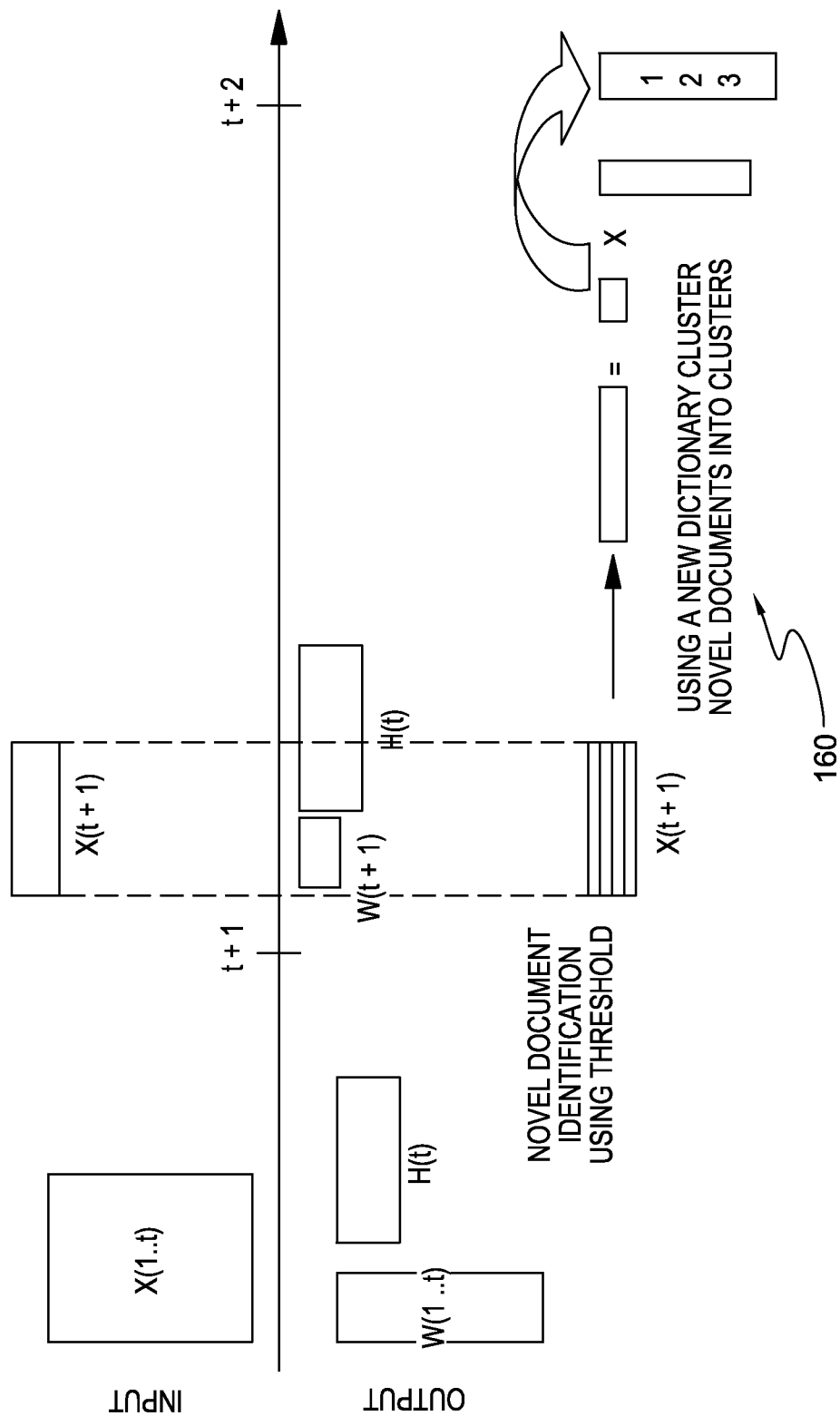
FIGS. 6 and 7 illustrates an approach of using robust objective function for detecting emerging topics.
Figure 7:
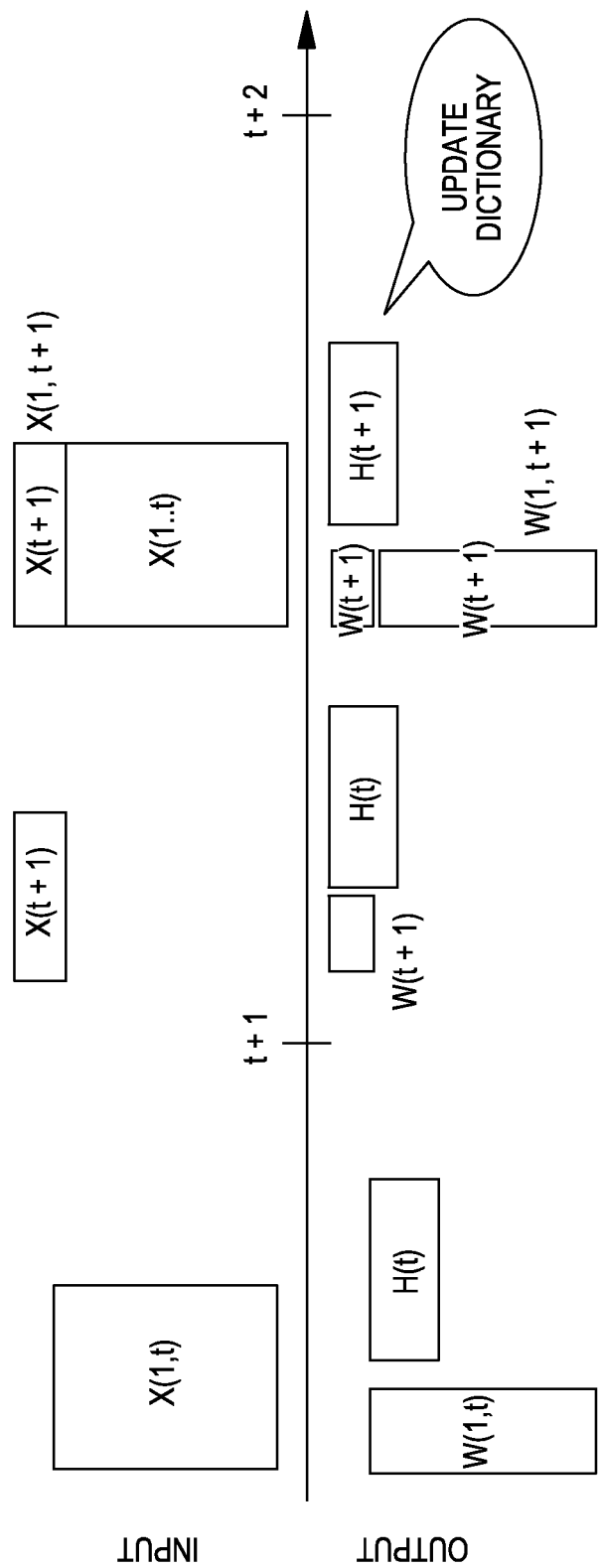

FIGS. 6 and 7 illustrate an approach of using robust $l_1$ objective function for detecting emerging topics.

Let $\{X(t) \in R^{N(t) \times D}, t=1, 2 \ldots\}$ denote a sequence of streaming matrices 152 where each row of X(t) represents an observation whose timestamp is t. In topic modeling applications over streaming documents, X(t) will represent the highly sparse document-term matrix observed at time t. $X(t_1,t_2)$ is used to denote the document-term matrix formed by vertically concatenating $\{X(t), t_1, \leq t \leq t_2\}$. At the current timepoint t, the model consumes the incoming data X(t) and generates a factorization (W(t), H(t)) comprising of K(t) topics.

One embodiment of this factorization stems from the following considerations: (1) The first K(t−1) topics in H(t) must be smooth evolutions of the K(t−1) topics found up to the previous timepoint, H(t−1). This is called the evolving set 154 and an evolution parameter, δ, is introduced which constrains the evolving set to reside within a box of size δ on the probability simplex around the previously found topics. With minor modifications, δ can also be made topic or word-specific e.g., to take topic volatility or word dominance into account. (2) A second consideration is the fast detection of emerging topics. At each timepoint, we inject additional topic bandwidth for this purpose. This is called the emerging set 156. Thus the topic variable H(t) can be partitioned into an evolving set of K(t−1) topics, $H^{ev}$, and an emerging set of $K^{em}$ topics $H^{em}$. Furthermore, it is assumed that emerging topics can be distinguished from noise based on their temporal profile. In other words, the number of documents that a true emerging topic associates with begins to rapidly increase. For this purpose, we introduce a short sliding time window ω is introduced over which topical trends are estimated. As discussed in more detail below, a novel regularizer $\Omega(W^{em})$ is defined that consumes the document-topic associations for the emerging bandwidth and penalizes components that are static or decaying so that learnt emerging topics are more likely to be ones that are rising in strength. (3) It is assumed that topics in the emerging set become part of the evolving set going forward, unless some of them are discarded as noise by manual guidance from the user or using criteria such as net current strength. In experiments, all topics in the emerging set were retained. This embodiment is discussed more below.

The discussion above motivates the following objective function that is optimized at every timepoint t.

$$(W^*, H(t)) = \arg\min_{W, H} \|X(t-w, t) - WH\|_{fro}^2 + \mu \Omega(W) \quad (1)$$

This objective function is minimized under the following constraints.

$$W, H \geq 0 \quad (2)$$

$$\sum_{j=1}^{D} H_{ij} = 1 \quad (3)$$

$$\forall i \in [K(t-1) + K^{em}]$$

$$\min(H_{ij}(t-1) - \delta, 0) \leq H_{ij}(t) \leq \max(H_{ij}(t-1) + \delta, 1), \quad (4)$$

$$\forall i \in [K(t-1)], \forall j \in [D]$$

W(t) is then extracted from the bottom rows of W* that correspond to X(t). The system is then said to have tagged the $i^{th}$ document (row) in X(t) with the most dominating topic $\arg\max_j W(t)(i,j)$ which gives a clustering of documents. Note that the regularizer, Ω(W), defined below, implicitly only operates on those columns of W that correspond to emerging topics. Note that W* is prepared for initializing parts of W in the next run. This hot-start mechanism significantly accelerates convergence.

In another embodiment of this factorization, the task of detecting novel signals in streaming datasets is formulated as a sparse signal representation problem. A signal is represented with a sparse code over an existing dictionary along with a sparse error term. A novel signal is detected based on the lack of sparsity in such a representation. While one application is emerging topic detection on streaming text, the methodology applies more broadly to other domains. This embodiment is discussed in more detail below.

In this embodiment, the objective function is a combination of the $l_1$-norms of a sparse error (robust reconstruction) and a sparse code which appears well suited for sparse high-dimensional datasets such as those that arise in text applications. Additionally, there are non-negativity constraints on the sparse code and dictionary, to maintain interpretability.

A new practical alternating direction method (ADM) is used to solve various optimization problems appearing in the formulation. ADM has recently gathered significant attention in the Machine Learning community due to its wide applicability to a range of learning problems with complex objective functions [S. Boyd, N. Parikh, E. Chu, B. Peleato, and J. Eckstein, Distributed Optimization and Statistical Learning via the Alternating Direction Method of Multipliers].

Temporal Regularization

Generally, the regularization operator $\Omega(W)$ is formulated by chaining together trend extraction with a margin-based loss function to penalize static or decaying topics. We begin with a brief discussion of trend filtering.

Hodrick-Prescott (HP) Trend Filtering: Let $\{y_t\}_{t=1}^T$ be a univariate time-series which is composed of an unknown, slowly varying trend component $\{x_t\}_{t=1}^T$ perturbed by random noise $\{z_t\}_{t=1}^T$. Trend Filtering is the task of recovering the trend component $\{x_t\}$ given $\{y_t\}$. The Hodrick-Prescott filter is an approach to estimate the trend assuming that it is smooth and that the random residual is small. It is based on solving the following optimization problem:

$$\arg\min_{\{x_t\}} \frac{1}{2} \sum_{i=1}^T (y_t - x_t)^2 + \lambda \sum_{t=2}^{T-1} ((x_{t+1}) - (x_t - x_{t-1}))^2 \quad (5)$$

Let us introduce the second order difference matrix $D \in R^{(T-2) \times T}$ such that $D(i,i)=1, D(i,i+1)=2,$ and $D(i,i+2)=1 \; \forall i \in [T-2]$ Then, it is easy to see that the solution to the optimization problem of Equation 5 is given by, $x=[I+2 \lambda D^T D]^{-1} y$, where we use the notation $y=(y_1 \ldots y_T)^T$, $x=(x_1 \ldots x_T)^T$. We use F to denote $[I+2 \lambda D^T D]^{-1}$, the linear smoothing operator associated with the Hodrick-Prescott Filter. Given the time series y, the Hodrick-Prescott (HP) trend estimate simply is $x=Fy$.

Loss Function for Measuring Emerging Trend: Let $x=Fy$ be the HP trend of the time series y. Let D be the forward difference operator, i.e., the only non-zero entries of D are: $D_{i,j}=-1$ and $D_{i,j+1}=1$. If $z=Dx$, then $z_i=x_{i+1}-x_i$ reflects the discrete numerical gradient in the trend x. Given $z_i$, we define a margin based loss function (the $l_2$-hinge loss), $L(z_i)=c_i \max(0, \delta-z_i)^2$, where if the growth in the trend at time i is sufficient, i.e., greater than $\delta$, the loss evaluates to 0. If the growth is insufficient, the loss evaluates to $c_i(\delta-z_i)^2$ where $c_i$ is the weight of timepoint i which typically increases with i. For a vector z, the loss is added over the components. In terms of the original time series y, this loss function is, $$L(y) = \sum_{i=1}^{T-1} c_i \max(0, \delta - DFy)_i)^2 \quad (6)$$

Optimization Problem: As documents arrive over $t \in [T]$, we use S to denote a T×N time-document matrix, where $S(i,j)=1$ if the document j has time stamp i. Noting that each column w of W, denotes the document associations for a given topic, Sw captures the time series of total contribution of the topic w over the time frame of S. Finally, we concretize equation (1) as the following optimization problem $\arg\min \|X-WH\|_{fro}^2 + \mu \Sigma L(Sw_i), W, H \geq 0$ and $w_i$ in $W^{em}$ (7)

subject to constraints in Equations (2) and (4)

We optimize the above objective using the rank-one residue iteration (RRI) approach [Ngoc-Diep Ho, Paul Van Dooren, and Vincent D. Blondel, Descent methods for non-negative matrix factorization, Numerical Linear Algebra in Signals, abs/0801.3199, 2007]. We approximate X as the sum of rank-one matrices $w_i h_i^T$ and optimize cyclically over individual $w_i$ and $h_i$ variables while keeping all other variables fixed. This results in three specific sub-problems, each of which requires an efficient projection of a vector onto an appropriate space.

Optimization over $h_i$: Holding all variables except $h_i$ fixed and omitting additive constants independent of $h_i$, equation (7) can be reduced to $\arg\min_{h_i \in C} \|R-w_i h_i^T\|_{fro}^2$ for appropriate $R \in R^{N \times D}$ independent of $h_i$. Simple algebraic operations yield that the above is equivalent to $$\arg\min_{h_i \in C} \|h_i - R^T w_i / \|w_i\|^2\|^2 \quad (8)$$

Case 1: $h_i$ is evolving: For an evolving topic, the optimization needs to be performed under the constraints of equations (4) and (3). Thus the optimum $h_i^*$ is obtained by projection onto the set $C = \{h_i : h_i \in \Delta_D, 1_j \geq h_{ij} \geq u_j\}$ for appropriate constants $l_j$ and $u_j$. This is equivalent to a projection onto a simplex with box constraints. Adapting a method due to [P. M. Pardalos and N. Kovoor. An algorithm for singly constrained class of quadratic programs subject to upper and lower bounds. Mathematical Programming, 46:321-328, 1990], we can find the minimizer in O(D) time i.e., linear in the number of coordinates.

Case 2: $h_i$ is emerging: For an emerging topic $C = \{h_i : h_i \in \Delta_D\}$ and the optimization equation (8) becomes equivalent to a projection onto the simplex $\Delta_D$, the same algorithm [P. M. Pardalos and N. Kovoor, An algorithm for singly constrained class of quadratic programs subject to upper and lower bounds, *Mathematical Programming*, 46:321-328, 1990] again gives us the minimizer in linear time O(D).

Optimization over evolving $w_i$: When $w_i \in W^{ev}$, the second term in equation (7) does not contribute and using the RRI scheme, the optimization problem can be written down as $w_i^* \doteq \arg\min_{w_i \geq 0} \|R-w_i h_i^T\|^2$. Similar to equation (8), simple algebraic operations yield that the above minimization is equal to the following simple projection algorithm $$\arg\min_{w_i \geq 0} \|w_i - Rh_i / \|h_i\|^2\|^2 \quad (9)$$

The corresponding minimizer is simply given by $$w_{ij} = \max\left(0, \frac{1}{\|h_i\|^2}(Rh_i)_j\right).$$

$$\arg\min_{w_i \geq 0} \|R - w_i h_i^T\|^2 + L(Sw_i)$$

Emerging $w_i$: When $w_i \in W^{em}$, the RRI step of the corresponding optimization problem look like $$\operatorname*{argmin}_{w_i \geq 0} \|w_i - Rh_i\|^2 + \mu L(Sw_i)/\|h_i\|^2 \qquad (10)$$

Noting that we choose L to be the $l_2$ hinge loss, equation (10) leads $$\operatorname*{argmin}_{w_i \geq 0} \|w_i - Rh_i\|^2 + \frac{\mu}{\|h_i\|^2} \sum_{i=1}^{T-1} c_i \max(0, \delta - q_i^T w_i)^2$$

to
where $q_i^T$-$(DFS)_i$. This can be converted into a generic mimization problem of the form $$\min_{w \geq 0} J(w) = \sum_i (\max(0, c_i(\delta_i - \langle w, x_i \rangle)))^2 + \frac{\lambda}{2}\|w - w_0\|^2 \qquad (11)$$

for some constant $w_0$. This is precisely the SVM optimization problem with additional non-negativity constraints on $w_i$. This objective is minimized using a projected gradient algorithm on the primal objective directly, as it is smooth and therefore the gradient is well defined. Thus $$w^{(k+1)} = \Pi(w^{(k)} - \eta_k \nabla J(w^{(k)})) \qquad (12) \ (12)$$

where $\Pi$ is the projection operator $\Pi(s) = \max(s, 0)$ and $$\nabla J(w^{(k)}) = -2\sum_i \max(c_i(\delta_i - \langle w^{(k)}, x_i \rangle), 0)x_i + \lambda(w^{(k)} - w_0)$$

The best rate $\eta_k$ at the $k^{th}$ step is chosen according to [C. J. Lin, Projected gradient methods for non-negative matrix factorization, In *Neural Computation*, 2007]. In particular $\eta_k = \beta^{t_k}$ for some constant $\beta$ and $t_k$ is the smallest integer for which $$J(w^{(k+1)}) - J(w^{(k)}) \leq \sigma \langle \nabla J(w^{(k)}), w^{(k+1)} - w^{(k)} \rangle \qquad (13)$$

At every iteration $\eta_k$ is hot started from $\eta_{k-1}$ and finally it is the largest $\eta$ which satisfies Equation (13).

$L_1$ Dictionary Learning Approach for Emerging Topic Detection

In the discussion below, the need for $l_1$ loss objective function is discussed, and then an optimization algorithm is presented that is used to solve an embodiment of the factorization.

Let $H(t-1)$ in $R^{m \times k}$ represent the dictionary after time $t-1$; where the dictionary $H(t-1)$ is a compact summary representation of all the documents in $X(1, t-1)$. Given a new document vector y with timestamp t, we see if y could be represented as a sparse linear combination of the rows of $H(t-1)$. The sparsest representation is the solution of:

$$\min_x \|x\|_0 \text{ such that } y = H(t-1)^T x, \text{ with } x \geq 0 \qquad (13)$$

where, $\|\ \|_0$ is the $l_0$ norm counting the non-zero entries of the vector. However, in general case solving the above optimization problem is NP-hard and also hard to approximate [E. Amaldi and V. Kann. On the Approximability of Minimizing Nonzero Variables or Unsatisfied Relations in Linear Systems]. Therefore, instead of solving the (13), we solve a convex relaxation of it:

$$\min_x \|x\|_1 \text{ such that } y = H(t-1)^T x + e \text{ such that } x \geq 0. \qquad (14)$$

In most practical situations, equation (14) is not applicable because it may not be possible to represent y as $H(t-1)^T x$, e.g., if y has new words which are absent (i.e., have no support) in $H(t-1)$. In such cases, one could represent $y = H(t-1)^T x + e$ where e is an unknown noise vector. In the presence of isotopic Gaussian noise, the $l_2$-penalty of $e = y - H(t-1)^T x$ gives the best approximation of x. However, for text documents (and in most other real scenarios), the noise vector e rarely satisfies the Gaussian assumption, and some of its coefficients contain large, impulsive values. In such scenarios, the $l_2$-penalty on the loss function may give an extremely bad approximation of x. However, in such a real-world scenario, imposing an l1 reconstruction error gives a more robust and better approximation of x. The following $l_1$-formulation is used to recover x.

$$\min_x \|y - H(t-1)^T x\|_1 + \lambda_1 \|x\|_1 \text{ such that } x \geq 0 \qquad (15)$$

Given a new document y with timestamp of t and a dictionary $H(t-1)$, equation (15) is solved to determine whether y is novel (with respect to dictionary $H(t-1)$) or not. If the objective value of (15) is "small," then y is well-reconstructed by a linear combination of some basis vectors in $H(t-1)$. Such documents are marked as non-novel discarded. Now, if the objective value is "large," then y has no good reconstruction among the basis vectors of the previous topics, thus suggesting novelty of y. We add such documents to the set $Nvl_t$.

Dictionary Update: The dictionary is updated so that it forms a compact summary representation of all the documents in $X(1, t)$. The dictionary is updated by minimizing $$W(t), H(t) = \operatorname*{argmin}_{W,H} \|X(1,t) - WH\|_1 + \lambda \|W\|_1 \text{ such that } W, H \geq 0 \qquad (16)$$

For scalability, an online version of dictionary learning is used, where only H is updated and use W is obtained from previous stages of the algorithm.

The algorithm alternates between a "detection stage", represented in FIG. 6, and a "dictionary learning stage," represented in FIG. 7. The detection stage at time t gets as input the dictionary $H(t-1)$ and $X(t)$, and for each document $p_j$ in $X(t)$, computes the best representation of $p_j$ in terms of $H(t-1)$ by solving equation (15) (where y is replaced by $p_j$). A document $p_j$ is classified as novel if the objective value of equation (15) is above some chosen threshold $\zeta$. Let $Nvl_t$ be the set of document that are marked as novel at time t. The set of novel documents is then passed to a clustering stage represented at 160. The idea is to again use dictionary learning. Given as input a set of (novel) documents and the number of topics $k_1$ to be generated, a suitable modification of equation (16) is used to detect emerging topics. The idea is as follows: If $Nvl_t$ represents the set of novel documents, we learn a dictionary with $k_1$ atoms, where each atom corresponds to an emerging topic. In other words, we minimize the following function over $(R(t), S(t))$:

$$R(t), S(t) = \operatorname*{argmin}_{R,S} \|Nvl_t - RS\|_1 + \lambda \|R\|_t \text{ such that } R, S \geq 0 \qquad (17)$$

Since, the size of $Nvl_t$ is typically small, this function is solved using a simple iterative batch procedure, alternatively fixing R(t), S(t) and updating the other variables using the method of alternating directions.

The dictionary learning stage is performed in an online fashion. In the online setting, instead of using equation (16), the dictionary is updated by minimizing the following function over H:

$$H(t) = \text{argmin}_H \|X(1,t) - W(1,t)H\|_1 \text{ such that } H \geq 0,$$

where $W(1,t) = [x_1, x_2, \ldots]$ are computed during the previous detection stages. This online dictionary learning framework has similar structure to that of [J. Mairal, F. Bach, J. Ponce, and G. Sapiro. Online Learning for Matrix Factorization and Sparse Coding].

To speedup the algorithms, the method of alternating directions is used to solve the various optimization problems. We start with a brief review of the general framework of ADM from [J. Yang and Y. Zhang. Alternating Direction Algorithms for $L_1$-Problems in Compressive Sensing]. Let $p(x): R^a \to R$ and $q(y): R^b \to R$ be convex functions, F in $R^{c \times a}$, G in $R^{c \times b}$, and z in $R^c$. Consider the following optimization problem $$\min_{x,y} p(x) + q(y) \text{ s.t. } Fx + Gy = z,$$

where the variable vectors x and y are separate in the objective, and coupled only in the constraint. The augmented Lagrangian for the above problem is given by $$L(x, y, \rho) = p(x) + q(y) + \rho^T (z - Fx - Gy) + \beta/2 \|z - Fx - Gy\|_2^2, \quad (18)$$

where $\rho$ is the Lagrangian multiplier and $\beta > 0$ is a penalty parameter. ADM utilizes the separability form of equation (18) and replaces the joint minimization over x and y with two simpler problems. The ADM first minimizes L over x, then over y, and then applies a proximal minimization step with respect to the Lagrange multiplier $\rho$.

Let R, be the set of positive real numbers. In the detection stage for each document $p_j$, the following program is solved: $\min_{x,e} \|e\|_1 + \lambda \|x\|_1$ such that $e = p_j - H(t-1)^T x$ Then the augmented Lagrangian form of the above is $$L(x,e,\rho) = \min_{x,e} \|e\|_1 + \lambda \|x\|_1 + \rho^T(p_j - H(t-1)^T x - e) + \beta/2 \|p_j - H(t-1)^T x - e\|_2^2 \quad (19)$$

ADM is now applied to the above Lagrangian. Let us assume that we have $(x_{(i)}, e_{(i)}, \rho_{(i)})$, $(x_{(i+1)}, e_{(i+1)}, \rho_{(i+1)})$ is constructed as follows. First, for a fixed $x_{(i)}$ and $\rho_{(i)}$, e is updated by solving $$\min_e \|e\|_1 + \rho_{(i)}^T(p_j - H(t-1)^T x_{(i)} - e) + \beta/2 \|p_j - H(t-1)^T x_{(i)} - e\|_2^2$$

The minimum value of the above optimization is attained by setting $$e = \text{soft}(p_j - H(t-1)^T x_{(i)} + \rho_{(i)}/\beta, 1/\beta),$$

where $\text{soft}(r, T) = \text{sign}(r) \times \max\{|r| - , 0\}$, where $\text{sign}(r)$ is the sign of vector r.

Now, for a fixed $e_{(i+1)}$ and $\rho_{(i)}$ a simple manipulation shows that we can obtain x that minimizes by solving the following $$\min_x \lambda \|x\|_1 + (\beta/2) \|p_j - H(t-1)^T x - e_{(i+1)} + \rho_{(i)}/\beta\|_2^2.$$

However, instead of solving the above optimization exactly, it is approximated by $$\min_x \lambda \|x\lambda^1 + \beta(g_{(i)}^T(x - x_{(i)}) + \rho/2 \|x - x_{(i)}\|_2^2 \quad (20)$$

where $\tau > 0$ is a proximal parameter and $g_{(i)} = H(t-1) (H(t-1)^T x_{(i)} + e_{(i+1)} - p_j - \rho_{(i)}/\beta)$. The minimum value of equation (20) is attained by setting $x = \max\{x_{(i)} - \tau g_{(i)} - (\lambda, \tau)/\beta, 0\}$. Now given fixed $x_{(i+1)}$ and $e_{(i+1)}$, multiplier $\rho$ is updated as $\rho_{(i+1)} = \rho_{(i)} + \gamma \beta(p_j - H(t-1)^T x_{(i+1)} - e_{(i+1)})$. The ADM equations for updating the dictionary H( ) are derived similarly.

Empirical Studies for Detecting Evolving and Emerging Topics using Temporal Regularizers The goal of this empirical study is to understand the influence of temporal regulation (evolution and emergence parameters) on the effectiveness of topic detection and tracking. To enable quantitative evaluation, two topic-labeled datasets were presented to the algorithm as streams, and the resulting topics generated by the system were benchmarked against ground truth topic assignments.

Figure 3:
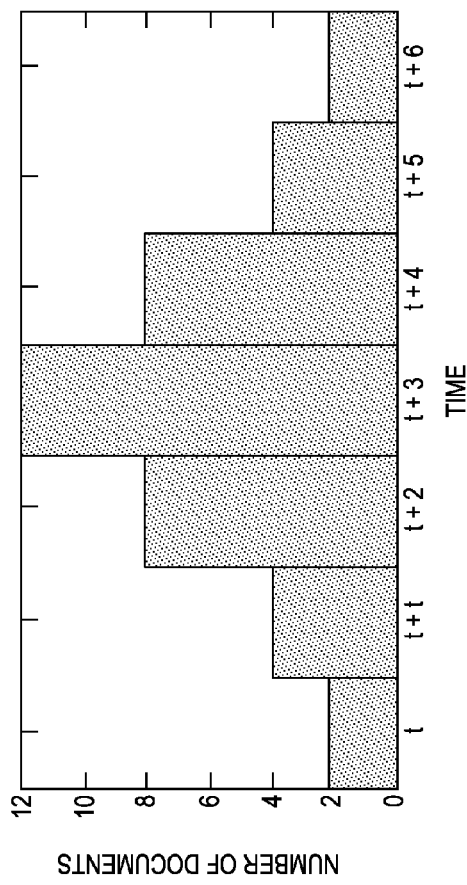
FIG. 3 shows the temporal profile of an emerging topic and overall dynamics in a simulated dataset used in an empirical study of an embodiment of this invention.
Figure 3:
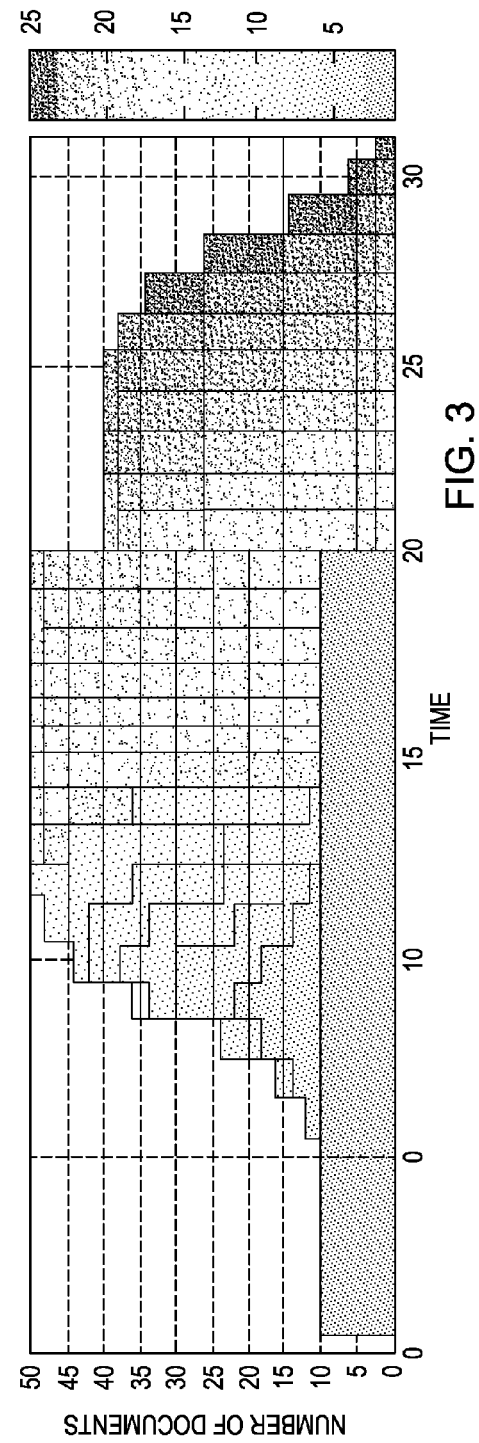

Datasets: Two datasets were used for the experiments. The Simulation dataset consists of 1000 documents with 2500 terms divided into 25 topics accumulated over 31 days. We generated a (nearly) low-rank document-term matrix, X=WH+S, where S is a noise matrix with sparsity 0.001 and non-zero elements randomly drawn from a uniform distribution on the unit interval. This dataset comprises of 25 topics whose term-distributions (as specified by the 25 rows of H) are random 2500-dimensional points on the topic simplex with sparsity 0.01. These topics are then randomly mixed (as specified in W) to create the documents such that each topic dominates 40 documents with at least 80% mixing proportions and each document on average contains 2.5 topics. These documents are then associated with timestamps such that topic i, i>5 steadily emerges at timepoint i with a time profile as shown in the left subfigure in FIG. 3. These emerging topics arise in the background of 5 initial static topics leading to an overall profile of temporal dynamics as shown (stacked area chart) in the right subfigure of FIG. 3. We choose the hinge parameter to be $\mu=5$ and emerging bandwidth of 1 per timepoint for this dataset. In the experiments, a sliding window of $\omega=7$ timepoints was used. The second dataset is drawn from the Nist Topic Detection and Tracking (TDT2) corpus which consists of news stories in the first half of 1998. In the evaluation, we used a set of 9394 documents represented over 19528 terms and distributed into the top 30 TST2 topics over a period of 27 weeks. We choose the hinge parameter to be $\mu=20$ and emerging bandwidth of 2 per week for this dataset. In the experiments, a sliding window of $\omega=4$ weeks was used.

Evaluation Metrics: For tracking, we use F1 scores, as commonly reported in topic detection and tracking (TDT) literature. A precise definition of micro averaged F1 used in the experiments is given in [Tzu-Chuan Chou and Meng Chang Chen, Using Incremental PLSI for Threshold-Resilient Online Event Analysis, *IEEE transactions on Knowledge and Data Engineering*, 2008]. A second performance metric is defined to capture how rapidly an emerging topic is "caught" and communicated to the user. Recall that a topic is communicated by the top keywords that dominate the associated term distribution in H(t). We first define true topic distributions as $H^{true}(t) = \text{argmin}_{H>0} \|X(1,t) - W^{true}H\|_{fro}^2$ where $W^{true}$ is set using true topic labels. Next, for each true topic i, we compute first detection time, which is the first timepoint at which the system generates a topic distribution in H(t) that is within a threshold of t from the true topic, as measured by symmetric KL-divergence. We then record the percentage of documents missed before detection, and take the average of this miss rate across all true topics.

Figure 4:
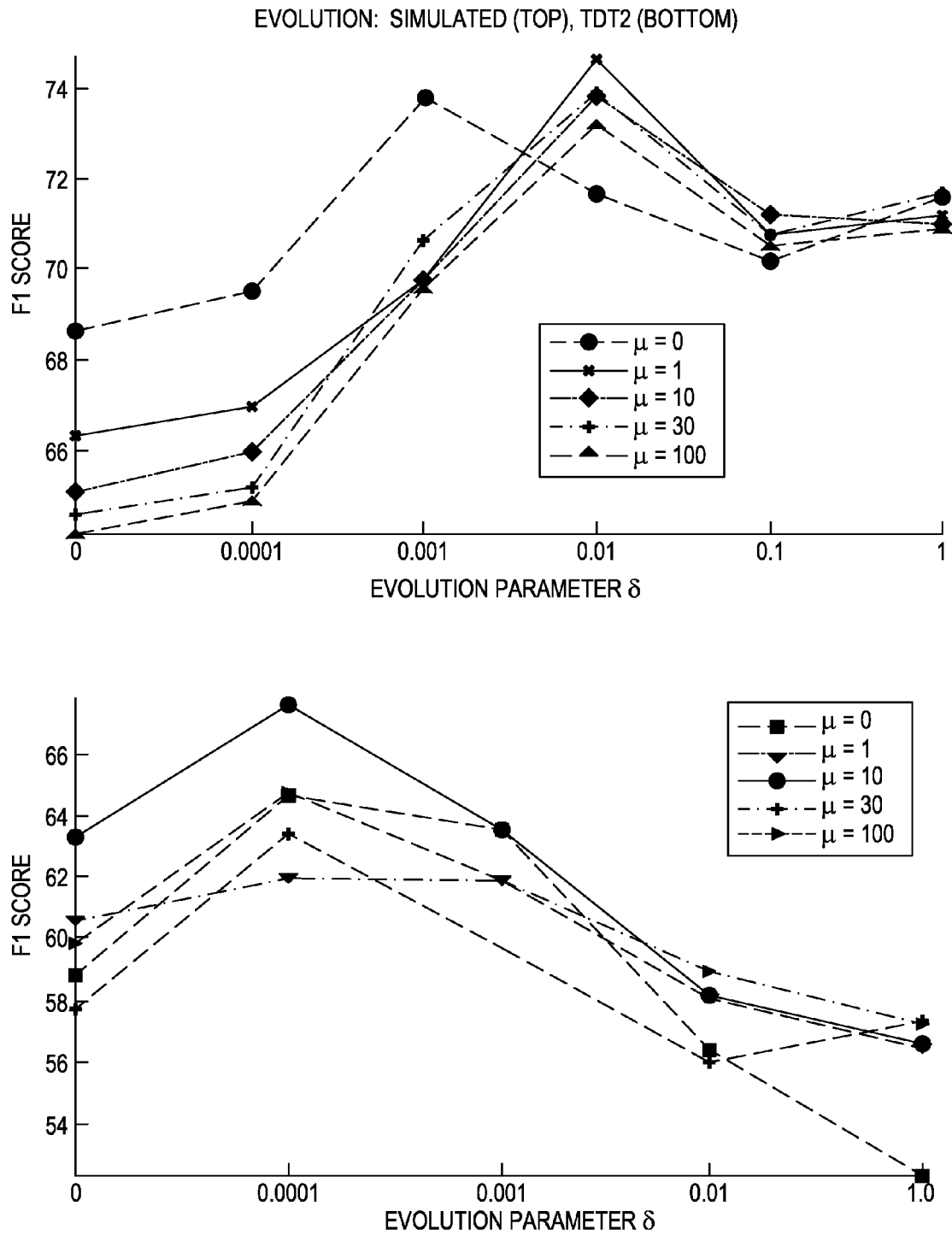
FIG. 4 shows the tracking performance as a function of an evolution parameter δ in an embodiment of the invention.
Figure 5:
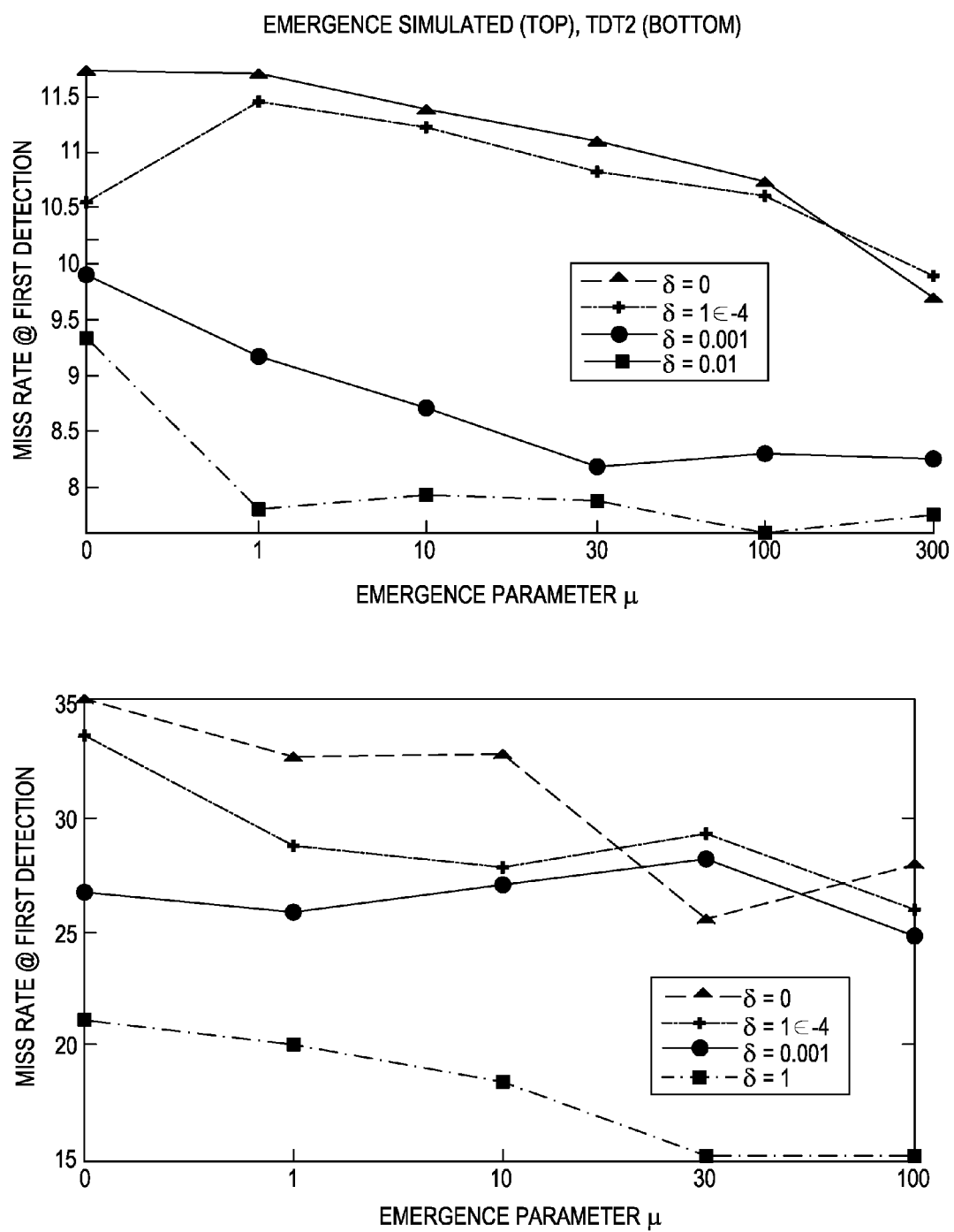
FIG. 5 shows the effectiveness of emergence regulation in an embodiment of the invention.

Results and Discussion: FIG. 4 shows tracking performance as a function of the evolution parameter $\delta$. When $\delta=0$, the system freezes a topic as soon as it is detected, not allowing the word distributions to change as the underlying topic drifts over time. When $\delta=1$, the system has complete freedom in retraining topic distributions, causing no single channel to remain consistently associated with an underlying topic. It can be seen that both these extremes are suboptimal. Tracking is much more effective when topic distributions are allowed to evolve under sufficient constraints in response to the statistics of incoming data. In FIG. 5 we turn to the effectiveness of emergence regularization. The figure shows how much information on average is missed before underlying topics are first detected, as a function of the emergence parameter μ. We see that increasing μ, for a fixed choice of δ, typically reduces miss rates, causing topics to be detected early. As δ is increased, topics become less constrained and therefore provide additional bandwidth to drift towards emerging topics, therefore lowering the miss rate curves. However, this comes at the price of reduced tracking performance. Thus, for a fixed amount of available topic bandwidth, there is a tradeoff between tracking and early detection that can be navigated with the choice of μ and δ.

Empirical Studies for Detecting Emerging Topic Detection using $L_1$ Dictionary Learning The goal of this empirical study is to understand the influence of using a $l_1$ loss function for detecting emerging topics. We first empirically evaluate our approach on publicly-available labeled datasets from news streams and newsgroups.

Evaulation Metrics: For the purpose of evaluation, we assume that documents in the corpus have been identified with a set of topics. For simplicity, we assume that each document is tagged with a single, most dominant topic that it associates with which we refer to as the true topic for that document.

We use variations of standard IR measures like pairwise precision, recall, and F1 score. Given X(t), the set of documents arriving at time t, let $TNvl_t$ be the set of true novel documents in X(t). Let $C_t$ be the set of system generated emerging topic clusters at time $t_t$ and let $T_t$ be the true emerging topic clusters at time t. Note that clusters in $T_t$ are formed over documents in $TNvl_t$, whereas the clusters in $C_t$ are formed over documents in $Nvl_t$, and $TNvl_t$ may not be equal to $Nvl_t$.

We define our evaluation metrics over the novel documents. Pairwise precision is the number of pairs of documents that are in the same cluster in both $T_t$ and $C_t$ divided by the number of pairs of documents that are in the same cluster in $C_t$. Pairwise recall is the number of pairs of documents that are in the same cluster in both $T_t$ and $C_t$ divided by the number of pairs of documents that are in the same cluster in $T_t$. Pairwise F1 is the harmonic mean of pairwise precision and recall.

We compare the performance of the algorithm against three alternative approaches that were created, which are based on combining nearest neighbor (NN) and K-Means algorithms with dictionary learning. We describe these baselines below.

NN-KM: To detect novel documents, we use the nearest neighbor approach used by the UMass FSD system [J. Allan. Topic Detection and Tracking: Event-based Information Organization], which is one of the best performing system for this task. As in the UMass system, we use cosine distance as a similarity measure and a TF-IDF weighted document representation. Every document in X(t) whose cosine distance to its nearest neighbor in X(t−1) is below some threshold is marked as novel. We build on this algorithm to get a baseline for emerging topic detection, by running a K-Means clustering with cosine distance (Spherical K-Means) on the documents marked novel.

DICT-KM: The second baseline is a modification of the above-identified dictionary based scheme. We use the dictionary learning approach to detect novel documents and then run a Spherical K-Means clustering on these novel documents to create emerging topic clusters.

NN-DICT: The third baseline is also a modification of the dictionary based scheme. We first use the nearest neighbor approach (explained above) to detect novel documents and then run a dictionary based clustering on these novel documents to create emerging topic clusters.

Results on TDT2 and 20 Newsgroups Datasets: We use two standard labeled datasets to evaluate the performance of the proposed algorithm. We start by describing these datasets and the experimental setup.

The first dataset is the NIST topic detection and tracking (TDT2) corpus. For the evaluation, we use a set of 9,394 documents represented over 19,528 terms and spread over 27 weeks. These documents are partitioned into 30 human-labeled topics. We introduce the documents from the 27 weeks in 5 different phases. In the zeroth phase, we introduce all the documents between weeks 1 to 5 and these documents are used for initializing the dictionary H(0). In the first phase, we introduce all the documents between weeks 6 to 7 and run the emerging topic detection on these documents with dictionary H(0). In the second phase, we introduce all the documents between weeks 8 to 13 and run the emerging topic detection algorithm on these documents with dictionary H(1) (outputted by the first phase). We repeat the same steps for the third phase (between weeks 14 to 17) and fourth phase (between weeks 18 to 27).

As the second dataset we use the 20 Newsgroups corpus. The corpus contains 18,774 articles distributed among 20 clusters where each cluster is a Usenet group. For the experiments, we use a vocabulary of 10,000 terms selected based on frequency. We do a set of controlled experiments on this corpus. Again, we introduce the documents in phases. Documents within each cluster are temporally ordered, and we use this temporal ordering to introduce the documents. At the end of Phase i-1, we have documents from some (old) clusters, and in Phase i we introduce a mixture of documents, some coming from these old clusters and some belonging to new clusters; and see how well the algorithm performs in detecting these new clusters. We begin Phase 0 with documents sampled from 6 randomly chosen clusters. In each subsequent phase, we introduce documents from 2 new clusters. The numbers of documents from added at each phase are presented in FIG. 8.

For baselines with K-Means clustering, we run the algorithm 8 times (with random initialization for centroids) and take the best result. FIG. 7 presents the maximum F1 for both datasets (obtained by varying thresholds). The algorithm always outperforms all the three baselines. For TDT2, the algorithm gives on average 16.9% improvement in F1 score over the NN-KM, 6.7% improvement over DICT-KM, and 4.3% improvement over NN-DICT. For 20 Newsgroups, we notice on average 16.0% improvement over NN-KM, 7.0% improvement over DICT-KM, and 9.0% improvement over NN-DICT. The results are shown in FIG. 8.

Figure 9:
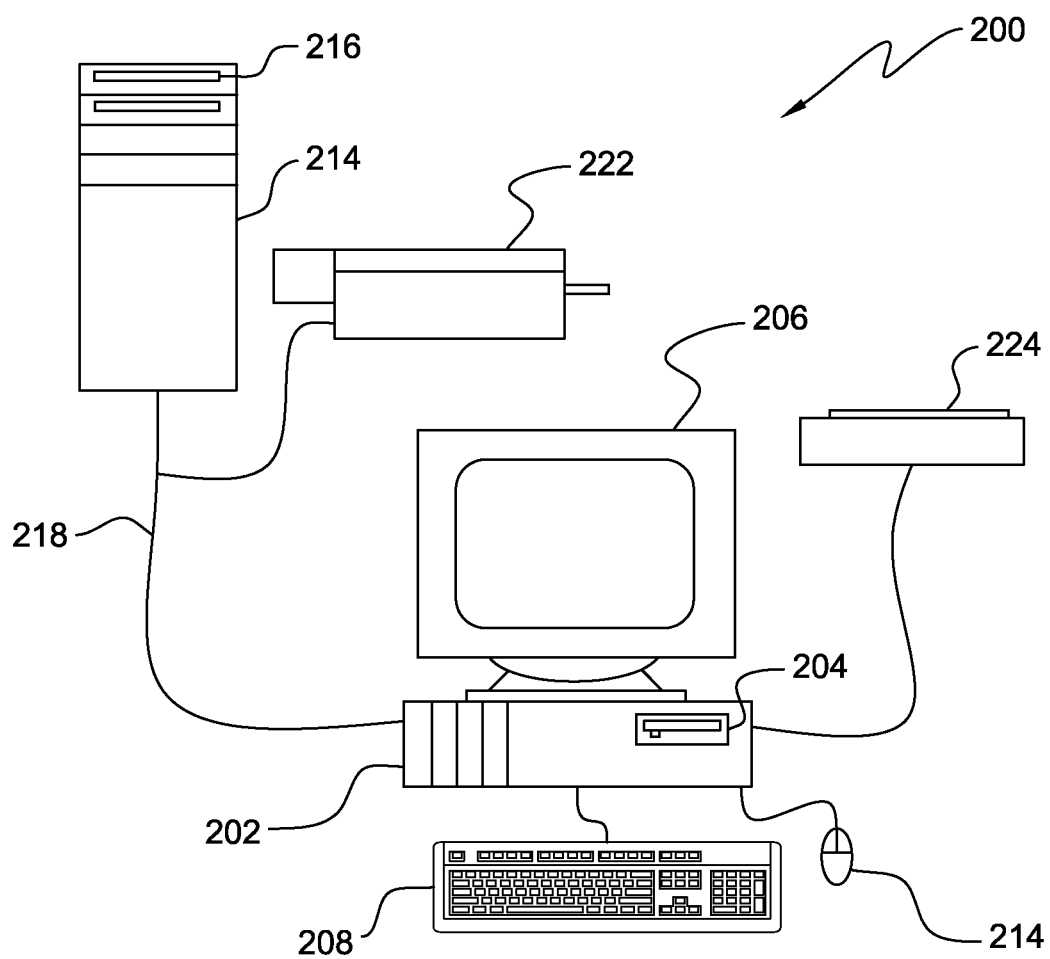
FIG. 9 depicts a computer system that may be used in the implementation of the present invention.

A computer-based system 200 in which a method embodiment of the invention may be carried out is depicted in FIG. 9. The computer-based system 200 includes a processing unit 210, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 210 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 210, as mentioned, or may be located on a remote system such as a server 230, coupled to processing unit 210, via a network interface such as an Ethernet interface. Monitor 240, mouse 250 and keyboard 260 are coupled to the processing unit 210, to provide user interaction. Scanner 280 and printer 270 are provided for document input and output. Printer 270 is shown coupled to the processing unit 210 via a network connection, but may be coupled directly to the processing unit. Scanner 280 is shown coupled to the processing unit 210 directly, but it should be understood that peripherals might be network coupled, or direct coupled without affecting the performance of the processing unit 210.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A system for inferring topic evolution and emergence as topics evolve and emerge over time in an evolving discussion comprised of a temporal sequence of a multitude of documents, the system comprising one or more processing units configured for:
    forming a group of matrices using text in the documents, said group of matrices including a first, document—word matrix X identifying a multitude of words in the documents, a second, document—type matrix W identifying a multitude of topics in the documents, and a third, topic-word matrix H identifying a multitude of words for each of said multitude of topics; and
    analyzing the temporal sequence of the documents to identify a first group of said multitude of topics as evolving over time from document to document in the evolving discussion and a second group of said multitude of topics as emerging over time in said evolving discussion, including
    for each of the documents, identifying the words of the first matrix that are in said each document
    and using the words of the document identified in the first matrix to identify one or more of the topics of the second matrix as one or more topics of said each document, and
    comparing the identified one or more topics of each of the documents with the identified one or more topics of others of the documents to identify the evolving topics and the emerging topics of the discussion; and wherein the analyzing the temporal sequence of the documents includes:
    using a first regularizer μ to enforce smooth evolution of the evolving topics; and
    using a second regularizer Ω to apply a topic bandwidth for early detection of the emerging topics.

2. The system according to claim 1, wherein said multitude of documents comprise a sequence of streaming documents, each of the documents being associated with a timepoint $t_i$ in a defined period of time T, and wherein the forming the group of matrices using data in the documents includes:
    forming a first sequence of matrices X(t), each of the first matrices X(t) identifying a multitude of words in each of a set of the documents associated with the timepoints within a defined sliding window in the time period T;
    forming a second sequence of matrices W(t), each of the matrices W(t) identifying a multitude of topics in said set of documents associated with the timepoints within said defined window; and
    forming a third sequence of matrices H(t), each of the matrices H(t) identifying a multitude of words for each of the topics identified in an associated one of the matrices W(t).

3. The system according to claim 2, wherein the analyzing the temporal sequence of the documents includes using a defined equation including the matrices X(t), W(t) and H(t), to identify the evolving and the emerging topics.

4. The system according to claim 3, wherein:
    said defined equation includes solving an $l_1$ dictionary learning problem to identify evolving topics, and using a reconstruction error to identify novel documents;
    the analyzing the temporal sequence of the documents further includes clustering said novel documents to identify emerging topics; and
    said defined equation is an objective function:

$$W^*, H^* = \mathrm{argmin}_{W,H} \|X - WH\|_1 + \lambda \|W\|_1 \text{ such that } W, H \geq 0.$$

5. The system according to claim 1, wherein the analyzing the temporal sequence of the documents includes:
    using a defined equation including the matrices to identify the evolving and the emerging topics; and
    said defined equation includes: the first regularizer μ to enforce smooth evolution of the evolving topics via constraints on an amount of drift allowed by the evolving topics; and the second regularizer Ω to apply a topic bandwidth for early detection of the emerging topics to extract smooth trends of candidate emerging topics.

6. A system for inferring topic evolution and emergence in a multitude of documents, the system comprising one or more processing units configured for:
    forming a group of matrices using text in the documents, said group of matrices including a first matrix X identifying a multitude of words in each of the documents, a second matrix W identifying a multitude of topics in each of the documents, and a third matrix H identifying a multitude of words for each of said multitude of topics; and
    analyzing said group of matrices to identify a first group of said multitude of topics as evolving topics and a second group of said multitude of topics as emerging topics; wherein:
    said multitude of documents comprise a sequence of streaming documents, each of the documents being associated with a timepoint $t_i$ in a defined period of time T;
    the forming the group of matrices using data in the documents includes:
    forming a first sequence of matrices X(t), each of the first matrices X(t) identifying a multitude of words in each of a set of the documents associated with the timepoints within a defined sliding window in the time period T;
    forming a second sequence of matrices W(t), each of the matrices W(t) identifying a multitude of topics in said set of documents associated with the timepoints within said defined window; and
    forming a third sequence of matrices H(t), each of the matrices H(t) identifying a multitude of words for each of the topics identified in an associated one of the matrices W(t);

the analyzing the groups of matrices includes using a defined equation including the matrices X(t), W(t) and H(t), to identify the evolving and the emerging topics;

said defined equation includes: a first regularizer μ to enforce smooth evolution of the evolving topics via constraints on an amount of drift allowed by the evolving topics; and a second regularizer Ω to apply a topic bandwidth for early detection of the emerging topics to extract smooth trends of candidate emerging topics; and said defined equation is an objective function:

$$(W^*, H(t)) = \arg\min_{W,H} \|X(t-w, t) - WH\|_{fro}^2 + \mu\Omega(W).$$

7. An article of manufacture comprising:

at least one tangible computer readable device having computer readable program code logic tangibly embodied therein to infer topic evolution and emergence as topics evolve and emerge over time in an evolving discussion comprised of a temporal sequence of a multitude of documents, said computer readable program code logic, when executing, performing the following:

forming a group of matrices using text in the documents, said group of matrices including a first, document—word matrix X identifying a multitude of words in the documents, a second, document—type matrix W identifying a multitude of topics in each of the documents, and a third, topic-word matrix H identifying a multitude of words for each of said multitude of topics; and analyzing the temporal sequence of the documents to identify a first group of said multitude of topics as evolving over time from document to document in the evolving discussion and a second group of said multitude of topics as emerging over time in said evolving discussion, including for each of the documents, identifying the words of the first matrix that are in said each document and using the words of the document identified in the first matrix to identify one or more of the topics of the second matrix as one or more topics of said each document, and comparing the identified one or more topics of each of the documents with the identified one or more topics of others of the documents to identify the evolving topics and the emerging topics of the discussion; and wherein the analyzing the temporal sequence of the documents includes:

using a first regularizer μ to enforce smooth evolution of the evolving topics; and using a second regularizer Ω to apply a topic bandwidth for early detection of the emerging topics.

8. The article of manufacture according to claim 7, wherein said multitude of documents comprise a sequence of streaming documents, each of the documents being associated with a timepoint $t_i$ in a defined period of time T, and wherein the forming the group of matrices using data in the documents includes:

forming a first sequence of matrices X(t), each of the first matrices X(t) identifying a multitude of words in each of a set of the documents associated with the timepoints within a defined sliding window in the time period T;

forming a second sequence of matrices W(t), each of the matrices W(t) identifying a multitude of topics in said set of documents associated with the timepoints within said defined window; and forming a third sequence of matrices H(t), each of the matrices H(t) identifying a multitude of words for each of the topics identified in an associated one of the matrices W(t).

9. The article of manufacture according to claim 8, wherein the analyzing the temporal sequence of the documents includes using a defined equation including the matrices X(t), W(t) and H(t), to identify the evolving and the emerging topics.

10. The article of manufacture according to claim 9, wherein:

said defined equation includes a first regularizer μ to enforce smooth evolution of the evolving topics via constraints on an amount of drift allowed by the evolving topics, and a second regularizer Ω to apply a topic bandwidth for early detection of the emerging topics to extract smooth trends of candidate emerging topics; and said defined equation is an objective function:

$$(W^*, H(t)) = \arg\min_{W,H} \|X(t-w, t) - WH\|_{fro}^2 + \mu\Omega(W).$$

11. The article of manufacture according to claim 10, wherein:

said defined equation includes solving an $l_1$ dictionary learning problem to identify evolving topics, and using a reconstruction error to identify novel documents;

the analyzing the temporal sequence of the documents further includes clustering said novel documents to identify emerging topics; and said defined equation is an objective function:

$$W^*, H^* = \arg\min_{W,H} \|X - WH\|_1 + \lambda\|W\|_1 \text{ such that } W, H \geq 0.$$

12. The article of manufacture according to claim 7, wherein the analyzing the temporal sequence of the documents includes:

using a defined equation including the matrices to identify the evolving and the emerging topics; and said defined equation includes: the first regularizer μ to enforce smooth evolution of the evolving topics via constraints on an amount of drift allowed by the evolving topics; and the second regularizer Ω to apply a topic bandwidth for early detection of the emerging topics to extract smooth trends of candidate emerging topics.

13. A method of inferring topic evolution and emergence over time in an evolving dataset comprised of a temporal sequence of a multitude of documents, the method comprising:

forming a group of matrices using text in the documents, said group of matrices including a first matrix X identifying a multitude of words in each of the documents, a second matrix W identifying a multitude of topics in each of the documents, and a third matrix H identifying a multitude of words for each of said multitude of topics; and analyzing the temporal sequence of the documents to identify a first group of said multitude of topics as evolving over time in the evolving dataset and a second group of said multitude of topics as emerging over time in the evolving dataset, including using the group of matrices to compare at least a plurality of the documents to others of the documents to identify some of the documents as novel documents based on defined criteria, and identifying the emerging topics from the novel documents; and wherein:

said multitude of documents comprise a sequence of streaming documents, each of the documents being associated with a timepoint $t_i$ in a defined period of time T;

the forming the group of matrices using data in the documents includes:

forming a first sequence of matrices X(t), each of the matrices X(t) identifying a multitude of words in each of a set of the documents associated with the timepoints within a defined sliding window in the time period T;

forming a second sequence of matrices W(t), each of the matrices W(t) identifying a multitude of topics in said set of documents associated with the timepoints within said defined window; and forming a third sequence of matrices H(t), each of the matrices H(t) identifying a multitude of words for each of the topics identified in an associated one of the matrices W(t);

the analyzing the groups of matrices includes using a defined equation including the matrices X(t), W(t), and H(t), to identify the evolving and the emerging topics;

said defined equation includes a first regularizer μ to enforce smooth evolution of the evolving topics via constrains on an amount of drift allowed by the evolving topics, and a second regularizer Ω to apply a topic bandwidth for early detection of the emerging topics to extract smooth trends of candidate emerging topics; and said defined equation is an objective function:

$$(W^*, H(t)) = \arg\min_{W,H} \|X(t-w, t) - WH\|_{fro}^2 + \mu\Omega(W).$$

14. The method according to claim 13, wherein the forming the group of matrices using text in the documents includes using the first matrix to form the second and third matrices.

15. The method according to claim 13, wherein the analyzing the group of matrices includes using a defined equation, including the first, second and third matrices, to identify the evolving topics and the emerging topics.

16. The method of claim 15 wherein the analyzing the group of matrices further includes:

using said defined equation to identify the novel documents based on reconstruction error; and clustering the novel documents to identify the emerging topics and for updating the evolving topics.

17. The method according to claim 16, wherein:

the using the defined equation includes applying a threshold on the reconstruction errors obtained from a solution of said defined equation to identify the novel documents; and the clustering the novel documents includes using a given clustering algorithm to cluster the novel documents.

18. A method of inferring topic evolution and emergence in a multitude of documents, comprising:

forming a group of matrices using text in the documents, said group of matrices including a first matrix X identifying a multitude of words in each of the documents, a second matrix W identifying a multitude of topics in each of the documents, and a third matrix H identifying a multitude of words for each of said multitude of topics; and analyzing said group of matrices to identify a first group of said multitude of topics as evolving topics and a second group of said multitude of topics as emerging topics, including using a defined equation to identify the evolving and emerging topics, using the group of matrices to compare at least a plurality of the documents to others of the documents to identify some of the documents as novel documents based on defined criteria, and identifying the emerging topics from the novel documents, wherein:

said defined equation includes a first regularizer μ to enforce smooth evolution of the evolving topics via constraints on an amount of drift allowed by the evolving topics, and a second regularizer Ω to apply a topic bandwidth for early detection of the emerging topics to extract smooth trends of candidate emerging topics; and said defined equation is an objective function:

$$(W^*, H(t)) = \arg\min_{W,H} \|X(t-w, t) - WH\|_{fro}^2 + \mu\Omega(W).$$

19. A method of inferring topic evolution and emergence in a multitude of documents, comprising:

forming a group of matrices using text in the documents, said group of matrices including a first matrix X identifying a multitude of words in each of the documents, a second matrix W identifying a multitude of topics in each of the documents, and a third matrix H identifying a multitude of words for each of said multitude of topics; and analyzing said group of matrices to identify a first group of said multitude of topics as evolving topics and a second group of said multitude of topics as emerging topics, including using a defined equation to identify the evolving and emerging topics, using the group of matrices to compare at least a plurality of the documents to others of the documents to identify some of the documents as novel documents based on defined criteria, and identifying the emerging topics from the novel documents, wherein:

said defined equation includes solving an $l_1$ dictionary learning problem to identify evolving topics, and using a reconstruction error to identify novel documents;

the analyzing the group of matrices further includes clustering said novel documents to identify emerging topics; and said defined equation is an objective function:

$$W^*, H^* = \arg\min_{W,H} \|X - WH\|_1 + \lambda \|W\|_1 \text{ such that } W, H \geq 0.$$

* * * * *